United States Patent [19]

Yates

[11] Patent Number: 4,533,095
[45] Date of Patent: Aug. 6, 1985

[54] DUCT MEANS FOR AIRCRAFT

[75] Inventor: Ivan R. Yates, Kingston-upon-Thames, England

[73] Assignee: British Aerospace Public Limited Company, London, England

[21] Appl. No.: 528,963

[22] Filed: Sep. 2, 1983

[30] Foreign Application Priority Data

Sep. 3, 1982 [GB] United Kingdom ............... 8225181

[51] Int. Cl.³ .............................................. B64C 29/04
[52] U.S. Cl. .................................. 244/23 D; 244/125; 244/53 R; 244/130
[58] Field of Search ................... 244/12.1, 23 R, 12.5, 244/23 D, 23 B, 12.3, 100 R, 100 A, 135 B, 130; 180/116, 124, 127, 128; 60/262

[56] References Cited

U.S. PATENT DOCUMENTS

| 2,777,656 | 1/1957 | Clifton | 244/135 B |
| 3,275,270 | 9/1966 | Earl et al. | 244/12.1 |
| 3,297,280 | 1/1967 | Lee | 180/116 |
| 3,869,103 | 3/1975 | Nelson et al. | 244/100 R |
| 4,026,503 | 5/1977 | Rhodes | 244/135 B |
| 4,214,721 | 7/1980 | Burhans et al. | 244/135 B |
| 4,222,233 | 9/1980 | Johnson et al. | 60/262 |

FOREIGN PATENT DOCUMENTS

| 1085767 | 7/1960 | Fed. Rep. of Germany | 244/12.5 |
| 6407065 | 12/1964 | Netherlands | 244/23 R |

Primary Examiner—Galen Barefoot
Attorney, Agent, or Firm—Cushman, Darby & Cushman

[57] ABSTRACT

A duct 11 for an aircraft comprises a flexible panel member 18 which is normally held in a non-fluid conducting condition adjacent the surface of the aircraft body by biass tension means 12, 13, so as to define a substantially continuous surface. On introduction of fluid pressure between the panel and the aircraft body, the panel member is inflated to overcome the biass of the tension means 12, 13, and to expand to a fluid conducting condition of relatively large cross-sectional area, upstanding from the surrounding aircraft surface regions.

9 Claims, 4 Drawing Figures

DUCT MEANS FOR AIRCRAFT

This invention relates to aircraft in which fluid is required to be ducted from one part of the aircraft to another.

Fluid ducts can take up much valuable space within an aircraft. Moreover, where fluid is required to be so ducted only during relatively minor periods of flight, it is apparent that the space taken up by ducts is wasted.

An object of the present invention is to provide ducting arrangements which are sufficiently large to accommodate a desired fluid flow but which do not absorb the valuable internal space of an aircraft to any great extent and which also do not degrade the performance of the aircraft in those phases of flight in which fluid requires not to be ducted.

According to one aspect of the invention, an aircraft in which fluid is required to be ducted from one part of the aircraft to another is provided with duct means which can be expanded to a fluid conducting condition of relatively large cross-sectional area and can be collapsed to a non-fluid conducting condition of relatively low cross-sectional area, the duct means, at least in the fluid conducting condition, lying generally externally of the aircraft contour.

By this arrangement, the profile of the aircraft need be only temporarily distorted by the expanded duct means.

Although suitable for any embodiment where fluid requires to be ducted from one part of an aircraft to another, the invention has particular use in aircraft having a vertical or short take-off capability where gaseous efflux requires to be temporarily ducted to a discharge region remote from the efflux source for direct lift and/or control purposes. In both circumstances, the forward speed of the aircraft is low (in the latter circumstance the forward speed being insufficient for aerodynamic control) so that any temporary drag increase due to the bulk of the expanded duct means is unimportant.

The duct means is preferably formed such that it is caused to expand from said non fluid-conducting condition to said fluid-conducting condition by virtue of fluid pressure acting therein.

The duct means advantageously includes a relatively flexible panel member adapted to be inflated from a non fluid-conducting condition in which it defines a substantially continuous surface region with adjacent surface regions of the aircraft to a fluid-conducting condition in which it upstands therefrom and defines, together with a further region of the aircraft, a relatively large cross-sectional area for the passage of fluid.

In this case, tension means are conveniently associated with at least one edge region of said flexible panel member, said tension means being biassed to draw the flexible panel member to its non fluid-conducting condition, the bias of the tension means being selected so that when a predetermined fluid pressure is supplied to a said duct means, the bias of the tension means is overcome to allow the flexible panel member to be inflated to its fluid-conducting condition. The tension means can comprise at least one relatively rigid side panel member attached to a region of the aircraft for biassed hinging movement.

Preferably, two such relatively rigid panel members are provided, each biassedly hinged to the aircraft body and each being associated with a respective opposed side region of the flexible panel member and arranged to draw the flexible panel member to its non fluid-conducting condition when there is little or no fluid supplied to the duct means.

Two embodiments of the invention are described by way of example with reference to the accompanying drawings in which.

Figure 1:
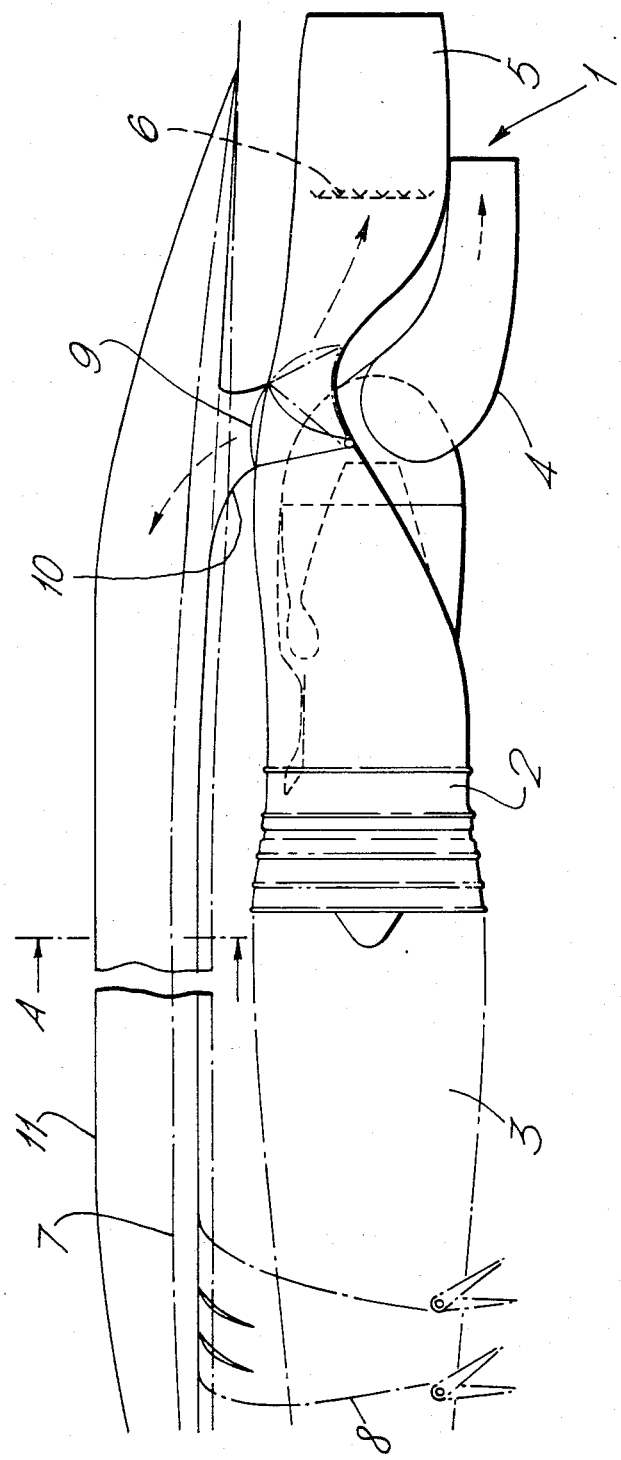
FIG. 1 is a diagrammatic side view of an aircraft engine installation.

Referring now to FIG. 1, an aircraft engine installation includes an aircraft structure 1, a by-pass type jet engine 2 having an intake duct 3, a vectorable hot exhaust outlet 4, and a rearwardly directed cool by-pass air outlet 5. The cool air in outlet 5 can be after-burned; after-burning gutters are shown at 6.

An upper surface of the aircraft structure is shown at 7.

A downwardly directed efflux outlet is shown forwardly of the engine 2 at 8; this lies, for example, between bifurcated regions of the intake duct 3. A valve 9 is provided in the outlet 5 to divert flow into a branch duct 10.

Since the outlet requires, during the take-off and landing phases of flight, to be in flow connection with the branch duct 10 to provide efflux for lift purposes, and the interior of the aircraft structure cannot contain a duct of sufficient cross-sectional area, or would require to be itself expanded in size so to do, an expandable/collapsible duct 11 is provided to provide flow connection outside the upper surface 7. This duct 11 is formed such that when flow is diverted by the valve into the branch duct 10, it expands to a fluid conducting condition, as drawn, of relatively large cross-sectional area but when flow is directed aft by the valve, it collapses to a non-flow conducting condition of low cross-sectional area in which it lies closely adjacent the upper surface 7.

Figure 2:
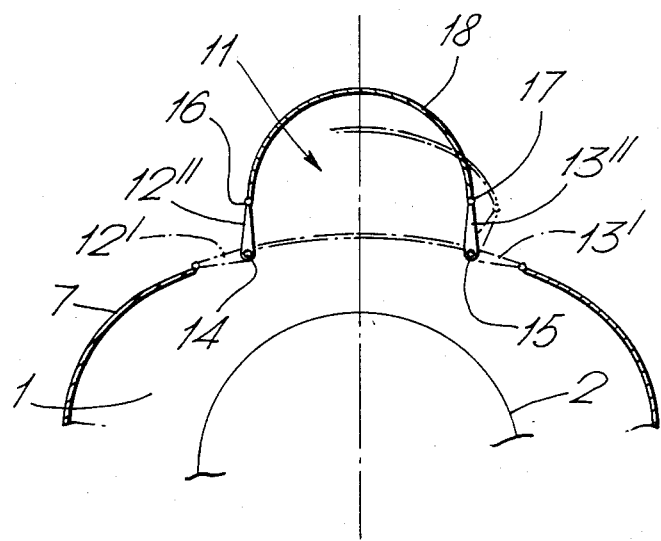
FIG. 2 is a cross-sectional view upon Arrows A—A of FIG. 1.

FIG. 2 illustrates in cross-section one embodiment of duct. This comprises twin longitudinally extending side panel members 12, 13 of rigid material hinged at their base edges 14, 15 respectively to the upper surface 7, and, at their free edges 16, 17 connected to the respective outboard edges of a flexible panel 18. This panel is formed from fibre reinforced elastomeric material. When swung outwards into the 12', 13' position, the side panel members lie generally flush with the surface 7, the flexible panel 18 is tensioned to lie closely adjacent the surface 7 to thus bring the duct into its non-fluid conducting condition of low cross-sectional area. During expansion of the duct, the side panel members swing towards each other about their base edges 14 and 15 to lie generally normal to the surface 7 in positions 12″, 13″, the flexible panel 18 bowing outwards under internal gaseous pressure from the free edges thereof to provide a duct of large cross-sectional area. The side panels 12, 13 may be spring biassed toward the outwards position by non-linear rate oil damped springs. An intermediate position is illustrated in broken outline.

In the above described embodiment, naturally, the lower boundary of the duct 11 is formed by the surface 7.

Figure 3:
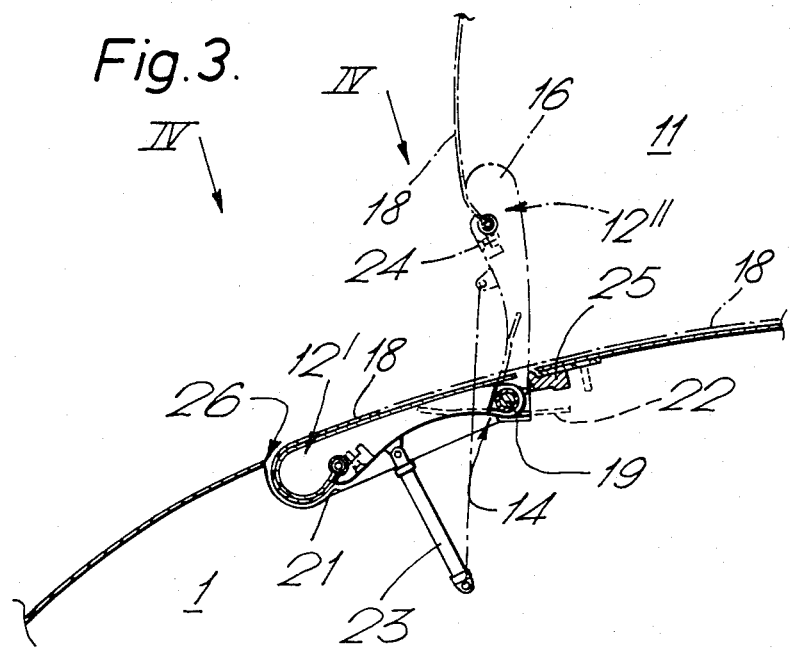
FIG. 3 is a detail view of a second embodiment of duct means.
Figure 4:
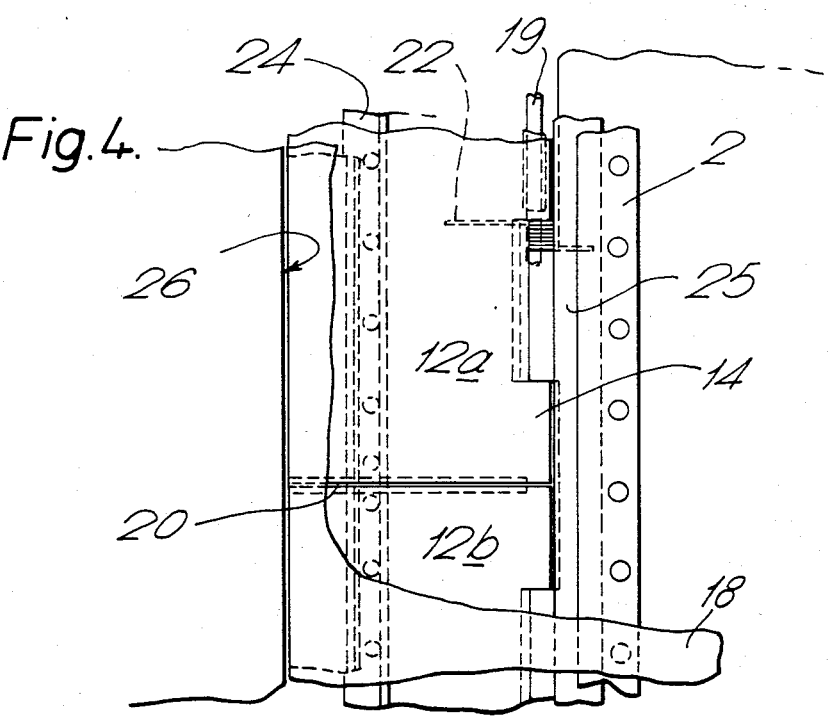
FIG. 4 is a part cutaway top plan view on Arrows IV—IV of FIG. 3 when the duct means is collapsed.

Referring now to FIGS. 3 and 4, there is illustrated a detail view of the interconnection between a side panel member 12 and the flexible panel 18 in a second embodiment of this invention. In these drawings like parts are given like references. In this embodiment, there are provided twin longitudinally extending side panel members 12, 13 supporting opposed edge regions of the flexible panel members 18. Each panel member operates in the same manner and is of similar construction to the other panel and thus only one panel member will be described in detail. The side panel member 12 is defined by portions 12a and 12b, each hingedly coupled to the aircraft structure 1 adjacent their base regions by means of a hinge pin 19 and adjacent portions of the panel member are sealed by means of a strip insert 20. The aircraft structure is provided with a longitudinal recess 21 adapted to receive side panel member 12 when the duct 11 is collapsed and panel member 12 is biassed toward this position by means of a torsion spring 22. A hydraulic strut damper 23 is connected between the side panel member and the aircraft structure which serves to reduce any tendency of the flexible panel member 18 to flutter. If required, the damper could also incorporate a mechanical lock operable to lock the duct in its collapsed condition.

An edge region of flexible panel 18 is attached to the free end of panel member 12 by means of a clamp strip 24 secured adjacent the free edge 16 of the panel member.

At one side of recess 21, there is provided a longitudinally extending, rubber or rubber like seal strip 25, shaped so that when the side panel member is lying flush within recess 21, (i.e. the duct is collapsed), a bleed flow passage exists between the base end 14 of the side panel member and the seal strip 25 so that fluid may pass therethrough to exhaust through slot 26 defined between the free edge 16 of the panel member and the adjacent end wall of recess 21.

When however the side panel 12 moves upwardly beyond a predetermined extent, the base portion of the side panel sealingly abuts seal strip 25.

By this arrangement, when fluid is initially supplied to duct 11 in its non fluid-conducting state, a bleed portion exhausts to atmosphere to blow out debris, ice accretion etc. As fluid pressure increases however the torsion of springs 22 is overcome and the panel member hinges to upstand from the aircraft body and seal strip 26 sealingly engages the base edge 14 of the side panel member to prevent further bleed flow, and the seal strip maintains pressure on the side panels when the duct is in its inflated condition. In addition, when the duct is to be collapsed from its inflated condition, once the fluid pressure within the duct has been reduced beyond a predetermined degree, the side panel will disengage from the associated seal strip to again provide the bleed flow passage thus to assist collapse of the duct 11.

It can be seen that in each of the above embodiments the side wall members 12 and 13 in effect are biassed to draw the flexible panel member 18 to its non fluid-conducting configuration, flush with the adjacent aircraft surfaces. On supply of fluid flow at sufficient pressure the bias of side wall members 12 and 13 is overcome to allow opposed edge regions of flexible panel member 18 to be drawn toward each other, thus to define a duct having a relatively large cross section.

I claim:

1. An aircraft having propulsive fluid outlet means and in which fluid is required to be ducted from a source of pressurized fluid to another part of said aircraft to be exhausted to provide a propulsion force, including elongate duct means having spaced inlet and outlet means, said inlet means being in flow communication with said source of pressurized fluid, and said outlet means being in flow communication with said propulsive fluid outlet means, said duct means including a relatively flexible imperforate panel element biased such that on introduction of pressurized fluid into said duct, said duct is caused to expand from a non-fluid conducting condition in which said panel element together with adjacent external surface regions of said aircraft defines a substantially continuous surface and a fluid conducting condition of relatively large cross-sectional area in which said panel element protrudes from the aircraft surface.

2. An aircraft according to claim 1, wherein tension means are associated with at least one edge region of said flexible panel member said tension means being biassed to draw the flexible panel member to its non fluid-conducting condition, the bias of the tension means being selected so that when a predetermined fluid pressure is supplied to a said duct means, the bias of the tension means is overcome to allow the flexible panel member to be inflated to its fluid-conducting condition.

3. An aircraft according to claim 2, wherein said tension means comprise at least one relatively rigid side panel member attached to a region of said aircraft for biassed hinging movement, so as to cause said flexible panel member to be drawn to its non fluid-conducting condition.

4. An aircraft according to claim 3, wherein two of said relatively rigid side panel members are provided, each biassedly hinged to said aircraft body and each being associated with a respective opposed side region of said flexible panel member and arranged to draw the flexible panel member to its non fluid-conducting condition when there is little or no fluid supplied to said duct means.

5. An aircraft according to claim 3, wherein said side panel member is attached to a respective edge region of the flexible panel member.

6. An aircraft according to claim 4, wherein each of said side panel members are attached to a respective edge region of said flexible panel member.

7. An aircraft according to claim 2, wherein damping means are associated with said tension means so as to at least reduce the tendency of flutter of said flexible panel member.

8. An aircraft according to claim 1, wherein bleed means are provided which are adapted to allow a bleed portion of the fluid supplied to said duct means to exhaust adjacent an edge region of said flexible panel member to remove dirt or foreign matter prior to inflation of said duct means.

9. An aircraft of at least one of the vertical and short take-off type comprising, a fuselage portion, by-pass type powerplant means located within said fuselage portion, elongate duct means extending along an upper surface of said fuselage portion for delivering by-pass flow from said powerplant means to propulsion fluid outlet means spaced longitudinally from said powerplant means, and including a relatively flexible imperforate panel element biased such that on introduction of by-pass fluid said duct means is inflated from a non-fluid conducting condition in which, together with adjacent surface regions of said fuselage portion, it defines a substantially continuous dorsal surface region, to a fluid conducting condition in which it upstands therefrom and, together with a further surface region of said fuselage portion defines said duct means of relatively large cross-sectional area.

* * * * *